United States Patent
Zoller

(10) Patent No.: US 10,778,330 B1
(45) Date of Patent: Sep. 15, 2020

(54) IDENTIFICATION OF ORPHANED LIGHT SOURCES IN WIRELESS LIGHTING NETWORKS

(71) Applicant: SYNAPSE WIRELESS, INC., Huntsville, AL (US)

(72) Inventor: Jeremy Jacob Zoller, Huntsville, AL (US)

(73) Assignee: Synapse Wireless, Inc., Huntsville, AL (US)

(*) Notice: Subject to any disclaimer, the term of this patent is extended or adjusted under 35 U.S.C. 154(b) by 0 days.

(21) Appl. No.: 16/054,050

(22) Filed: Aug. 3, 2018

(51) Int. Cl.
| | |
|---|---|
| *H04B 10/00* | (2013.01) |
| *H04B 10/116* | (2013.01) |
| *H04B 10/50* | (2013.01) |
| *H04B 10/27* | (2013.01) |
| *H04B 10/516* | (2013.01) |
| *H05B 47/19* | (2020.01) |

(52) U.S. Cl.
CPC .......... *H04B 10/116* (2013.01); *H04B 10/27* (2013.01); *H04B 10/502* (2013.01); *H04B 10/516* (2013.01); *H05B 47/19* (2020.01)

(58) Field of Classification Search
CPC . H04B 10/116; H04B 10/112; H04B 10/1123; H04B 10/1127; H04B 10/1129; H04B 10/114; H04B 10/1143; H04B 10/1149
USPC ....... 398/172, 128, 130, 118, 119, 127, 129, 398/131, 135, 182, 183, 202, 208, 209, 398/115
See application file for complete search history.

(56) References Cited

U.S. PATENT DOCUMENTS

| | | | |
|---|---|---|---|
| 9,008,519 B2* | 4/2015 | Park | H04B 10/1149 398/172 |
| 9,374,874 B1 | 6/2016 | Ewing | |
| 2009/0171571 A1 | 7/2009 | Son et al. | |
| 2010/0215378 A1 | 8/2010 | Rajagopal et al. | |
| 2015/0147067 A1 | 5/2015 | Ryan et al. | |
| 2015/0372753 A1* | 12/2015 | Jovicic | H04B 10/116 398/172 |

(Continued)

OTHER PUBLICATIONS

Zoller, U.S. Appl. No. 16/054,052, entitled, "Mapping Light Location Through a Data Modulated Light Output and Real-Time Location Information," filed on Aug. 3, 2018.

*Primary Examiner* — Hanh Phan
(74) *Attorney, Agent, or Firm* — Maynard Cooper & Gale; Chitra M. Kalyanaraman, Esq.

(57) ABSTRACT

Lights may be misconfigured during installation or after they are installed in a facility, such that these lights, also known as orphaned nodes, cannot receive control messages sent by a lighting control system. After installation, a mobile device can be used to identify the network a particular light source is communicating on, by use of a photodetector that detects, in the visible light signal emitted by a light source, data representing the network ID used by the light source. The mobile device can determine from that data whether or not the light source is communicating over the wrong network. If it is determined that a light source is on the wrong network, and therefore orphaned, the mobile device can switch its own configuration so as to be able to communicate to the orphaned light source, and provide instructions to reconfigure the light source to use a corrected network ID.

18 Claims, 4 Drawing Sheets

(56) References Cited

U.S. PATENT DOCUMENTS

2016/0047890 A1    2/2016  Ryan et al.
2016/0149640 A1*   5/2016  Jovicic ................. H04B 10/116
                                                    398/127

* cited by examiner

IDENTIFICATION OF ORPHANED LIGHT SOURCES IN WIRELESS LIGHTING NETWORKS

RELATED ART

As managed lighting solutions have grown in complexity and functionality, the need to efficiently manage the connectivity of the lights within such systems has become essential. Lights in modern lighting systems function as nodes of a wireless network, capable of receiving data from and transmitting data to other network devices. In a wireless network, communication to and from nodes relies in part on the use of a network identifier that identifies the wireless network to which those nodes belong. Where separate networks are in physical range of each other, each network distinguishes its respective network traffic through the use of a unique network identifier. A message, sent to a node on a wireless network, that does not specify the correct network identifier, is ignored by that node and is not processed. Accordingly, nodes on one wireless network may only communicate with each other by using the same network identifier unique to that network.

A node in a wireless network may become disconnected from communication with the remainder of its network (hereafter referred to as being "orphaned" or as an "orphaned node") where the node is assigned to and expected to participate in a particular network (or in a particular hierarchy), but does not properly obtain a network identifier from a network device during the network initialization process, or otherwise becomes misconfigured. In such a scenario, the orphaned node may be expecting communication on one network while the devices it expects to communicate with are actually on a different, "correct" network. In short, an orphaned node cannot "hear" any instructions sent on its intended network. On the other end of that transmission, a network management device responsible for instructing the orphaned node may not be able to recognize that the node has become isolated from communication and/or may be unable correct the node's misbehavior.

In a lighting system, an orphaned node, i.e., a light that cannot receive or respond to control messages, may be stuck in an on or off state or in an unintended lighting pattern. An orphaned light may be unaware that is it not functioning correctly. Further, an orphaned light may be unable to register with a lighting management device that normally would control the operational states of the orphan, and the lighting management device may be unaware that the orphaned light exists or that it is unable to communicate. Even in a scenario where a lighting management device recognizes that a light is orphaned, correction of the problem may be complex, time consuming, and burdensome, as the lighting management device cannot simply send a request to the orphaned light to fix itself (as such a message would be discarded). The issue of orphaned nodes is therefore a difficult problem to solve automatically.

A high number of orphaned nodes can lead to network inefficiency and waste of resources. Further, lights stuck in an off state may result in areas of low illumination in a building, and potentially hazardous conditions. A need therefore exists for a solution to identify a light that is orphaned from its network, even after it has been installed, and to quickly restore that orphaned light to its normal configuration.

Accordingly, further techniques for confirming the network configuration of a light source during commissioning of a set of installed lights are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to lighting control systems and methods. In one exemplary embodiment, light sources (such as light emitting diodes, commonly referred to as LEDs) are installed in an indoor facility. The light sources can be controlled by a set of lighting controllers and a central lighting management system, via radio frequency (RF) communication. When a light source has disassociated itself from a wireless network due to, for example, a configuration error, malfunction, or a variety of other reasons, the light source cannot receive communications sent via RF transmission from the central lighting management system or other network devices. If this problem arises after the time of installation of the light sources, a user may have to resolve this problem during the configuration or commissioning of the lighting system.

While located in the physical vicinity of a light source, a user, through a mobile device, can collect information about the configuration of a light source by using a photosensor that can recognize modulation of a light source's output. A lighting controller for the light source can modulate the light source's output to emit data at a rate not visible to the human eye, but accessible to the photosensor. The mobile device, being in a visible light range of the light source, can access that data through the mobile device, and read from it a network identifier (or subnetwork identifier, or in a multi-channel architecture, a particular channel identifier) with which the light source is currently configured. From this information, the mobile device can determine whether the light source is improperly configured. The mobile device, now knowing a network identifier that can be used to successfully send messages to the light source, can modify its own settings to communicate, via that network identifier, a request for the light source to change its network identifier settings. Accordingly, a configuration error in a light source can be corrected after installation with relative ease, thereby reducing the probability of orphaned nodes and the duration of their unavailability.

Figure 1:
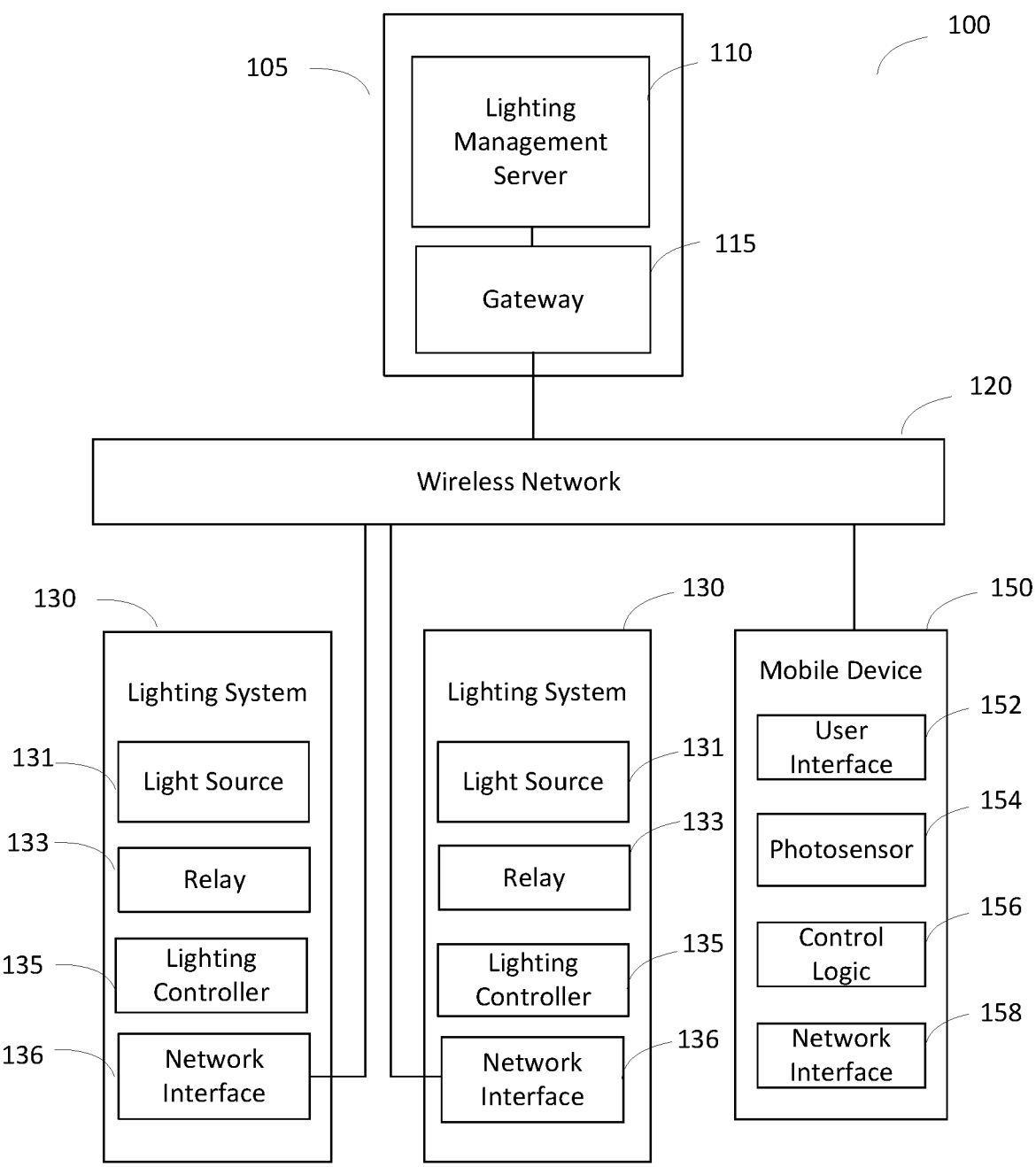
FIG. 1 is a block diagram illustrating an exemplary embodiment of a wireless network in accordance with the present disclosure.

FIG. 1 depicts an exemplary embodiment of a lighting control system 100 installed in an indoor (or largely indoor) space (e.g., a building or warehouse). The lighting control system 100 comprises a lighting management server 110 coupled to a gateway 115. In an exemplary embodiment illustrated in FIG. 1, lighting management server 110 and gateway 115 are different logical components in a server 105. In such embodiments, the lighting management server 110 and gateway 115 may reside within the same housing and/or share resources, such as processing hardware or other components, although other configurations of the server 105 are possible. In alternate embodiments, lighting management server 110 and gateway 115 may be discrete network devices connected via a wireless or wired connection. As an example, the lighting management server 110 may reside at a remote location and communicate with the gateway through a network, such as the internet or other type of wide area network (WAN), as further described below. In yet another alternate embodiment, the functionalities of lighting management server 110 and gateway 115 are all performed by a single logical component of the server 105.

In any of the embodiments described herein as using a gateway 115, the gateway 115 may convert messages in accordance with one protocol into messages in accordance with another protocol for transmission of the messages through a different type of network. As an example, if the lighting management server 110 is at a remote location, the gateway 115 may receive messages from the wireless network 120 and encapsulate such messages in accordance with TCP/IP or other protocol for transmission of the messages to the lighting management server 110. Messages from the wireless network 120 to be transmitted to other destinations may be similarly encapsulated or otherwise converted into a different protocol as may be desired. In the opposite direction, the gateway 115 may de-encapsulate messages received from a WAN or other type of network to remove overhead used by the WAN or other type of network for routing messages.

in the embodiment shown by FIG. 1, the gateway 115 connects the lighting management server 110 to one or more lighting systems 130 via a wireless network 120. In the preferred embodiment, the wireless network 120 is a network of wireless devices (e.g., lighting systems 130), but different types of wireless or, alternatively, wired networks (or combinations thereof) are possible in other embodiments. Note that use of a gateway 115 is unnecessary. As an example, it is possible for the server 105 to have a communication device, such as an RF radio, that permits the lighting management server 110 to communicate directly with the wireless network 120 in accordance with the protocol used by the wireless network 120.

In the preferred embodiment shown by FIG. 1, each lighting system 130 comprises a light source 131 such as a light emitting diode (LED) (or, if appropriate, a laser diode, a fluorescent lamp, an incandescent light, or other light source), a lighting controller 135 for controlling the light source 131, a relay 133, and a network interface 136 for communicating wirelessly (e.g., via radio frequency (RF) communication). The light sources 131 illuminate respective areas of the facility with visible light. The relay 133 is an electrically operated switch configured to supply electrical current to the light source 131 based on control signals received by the relay 133 from the lighting controller 135. Note that, in FIG. 1, only one light source 131 and one lighting controller 135 are shown in each lighting system 130 for illustrative purposes, but any number of light sources 131 and any number of lighting controllers 135 may be utilized in each lighting system 130 in other embodiments. In an alternate embodiment, a single lighting controller 135 may control multiple light sources in multiple lighting systems.

Lighting controller 135 may have control logic than can exercise various controls over light source 131, including, for example, turning the light source 131 on and off, or dimming the brightness of the light source 131. In addition, lighting controller 135 may contain control logic that allows for configuration or reconfiguration of the lighting system 130, including, for example, the network 120 (or other channel of communication) on which the network interface 136 of lighting system 130 is configured to transmit and receive data. In an exemplary embodiment, each light source 131 is stationary (fixed in place) on installation, however, alternate embodiments may exist such that a light source can be moved to a different physical location.

For illustrative purposes, with reference to FIG. 1, it can be assumed that any of the components of lighting control system 100 are capable of wireless communication with any device or component connected to it (either directly or indirectly) by the depicted lines. However, it will be noted that in addition to, or as an alternative to, wireless communication, any or all of the components of the lighting system 130 may be coupled to another component through a physical medium.

In the preferred embodiment of FIG. 1, each lighting system 130 is a distinct node of the wireless network 120 and is independently manageable. In another embodiment, the light source 131 may be a node of the wireless network 120 distinct from its respective lighting controller 135 and/or other components of its lighting system 130.

The embodiment shown by FIG. 1 also includes a mobile device 150 operable by a user. Although only one mobile device 150 is shown, it will be understood that any number of mobile devices 150 may be in use in the lighting control system 100. A mobile device 150 may, in the preferred embodiment, be a mobile computing device such as a cellular telephone, PDA, tablet, laptop computer, or a handheld peripheral device, among other things. The mobile device 150 includes a network interface 158, via which the mobile device 150 is capable of communicating with the lighting management server 110 and the lighting systems 130. While, in one embodiment, mobile device 150 communicates via RF communication, the mobile device 150 may additionally communicate via infrared or ultrasound technology as appropriate, or via another form of wireless communication. The mobile device 150 also includes a photosensor 154 (also referred to herein as a "photodetector" or "photodetecting sensor"), which is any type of photodetecting sensor (e.g., a photodiode, phototransistor, among others). The photosensor 154 is capable of receiving data from lighting system 130 through the modulation of light source 131 (such as data through visible light communication (VLC) technology), the receipt of which is described further in the present disclosure, and may also be capable of receiving the on/off status of light source 131, among other information.

In the preferred embodiment, mobile device 150 also includes control logic 156 for controlling the functions of the mobile device 150. The control logic 156 can be implemented in software, hardware, firmware, or any combination thereof. When implemented in software, the control logic 156 can also be stored on any computer-readable medium, for example electronic, magnetic, or optical mediums, among others, or another system, apparatus, or device. The control logic 156 is implemented by a processing element (not shown), or any other circuitry capable of executing the instructions of the control logic 156.

The mobile device 150 may also, in one embodiment, include a user interface 152. A user of the mobile device 150 may use the user interface 152 to, for example, enter information (e.g., configuration information) about a light source 131 or communicate with networked devices. The user interface 152 may be a software-implemented graphical user interface (GUI), however, the user interface 152 may take any form (e.g., text-based entry) that allows the user to view information received through the sensor 154 and/or to transmit information to the lighting management server 110 through the mobile device 150 as described herein.

Despite the reference to a "mobile" device throughout the present disclosure, it is also possible in an alternative embodiment for the mobile device 150 to be substituted with a stationary device (e.g., a desktop computer) with the photodetecting sensor 154 being a separately-enabled mobile component that communicates to the stationary device or directly to the lighting management server 110.

Figure 2:
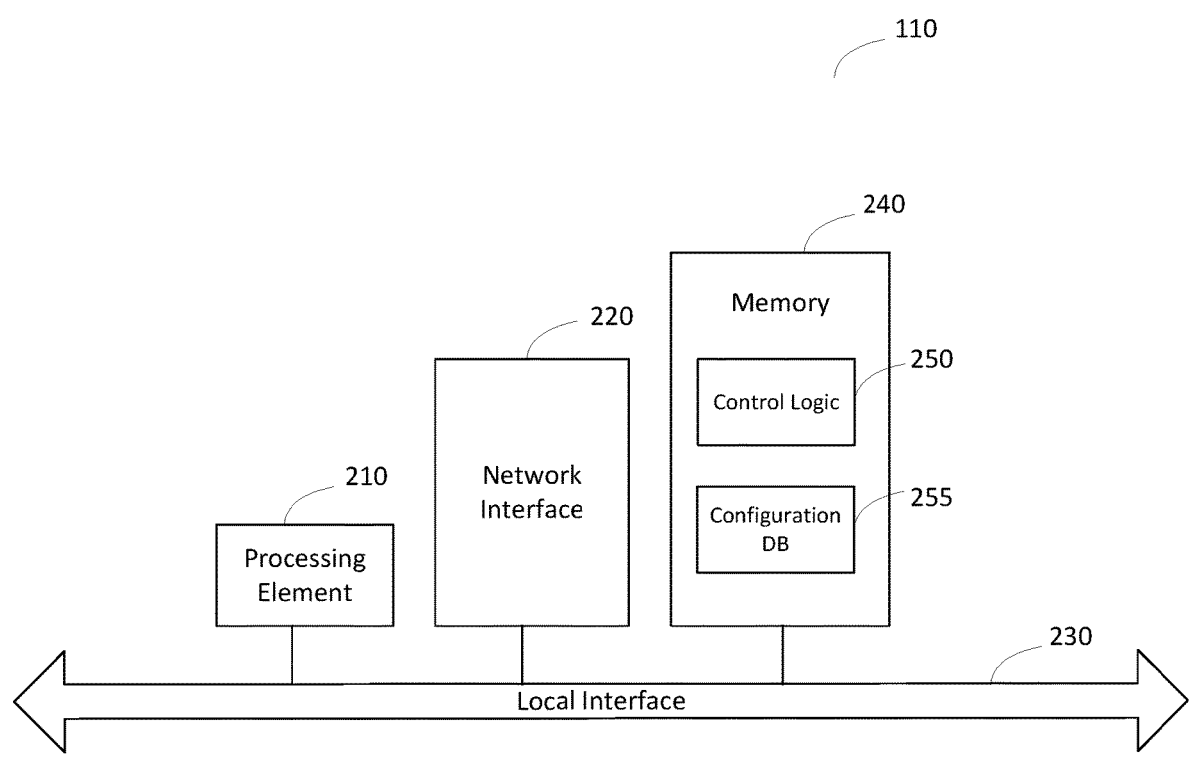
FIG. 2 is a block diagram illustrating an exemplary embodiment of a lighting management server, such as is depicted by FIG. 1.

FIG. 2 depicts a lighting management server 110 in accordance with an exemplary embodiment of the present disclosure. The exemplary server 110 comprises at least one processing element 210, such as a central processing unit (CPU), digital signal processor, other specialized processor or combination of processors, or other circuitry that communicates to and drives the other elements within server 110 via a local interface 230 (for example, a bus).

The server 110 has control logic 250 for generally controlling the operation of the server 110. The control logic 250 may also be configured to communicate with the lighting systems 130 via the wireless network 120 to control their configuration and operation. In a preferred embodiment, the control logic 250, via the network interface 220, may communicate with the lighting systems 130 by transmitting messages to their network interfaces 136 in order to, for example, manage an on/off state of each light source 131. Control logic 250 may also communicate with a mobile device 150 by transmitting and receiving messages via network interface 158. The control logic 250 can be implemented in software, hardware, firmware, or any combination thereof. In the embodiment illustrated in FIG. 2, the control logic 250 is implemented in software and is stored in a memory 240. The control logic 250, when implemented in software, can also be stored on any computer-readable medium, for example electronic, magnetic, or optical mediums, among others, or another system, apparatus, or device. The control logic 250 is implemented by a processing element 210, which comprises processing hardware (e.g., one or more processors) for executing instructions stored in the memory 240, or any other circuitry capable of executing the instructions of the control logic 250.

The memory 240 also stores configuration database 255 containing information related to the configuration process. It will be noted that while FIG. 2 refers to a configuration "database," the information stored within may not be in a database structure, and instead any type of data structure may be used. The configuration database 255 stores, among other things, information collected by the mobile device 150 and information for management of each of the lighting systems 130, including a unique identifier for every light source 131 known to be installed in the facility. This unique identifier may, in a preferred embodiment, be a MAC address of the light source 131. Various other data and code can also be written to or read from memory 240.

The server 110 also has a network interface 220 for enabling communication with other devices in lighting control system 100. In an exemplary embodiment, network interface 220 enables communication to devices on the wireless network 120 via the intermediary gateway 115 (FIG. 1). Communication between lighting management server 110 and gateway 115 may be performed, for example, over a wide area network (WAN), such as, for example, the internet or other type of network. In an exemplary embodiment, the network interface 220 is configured to communicate wirelessly over one or more geographic areas, but the interface 220 may alternately or additionally exchange data via a physical medium.

Figure 3:
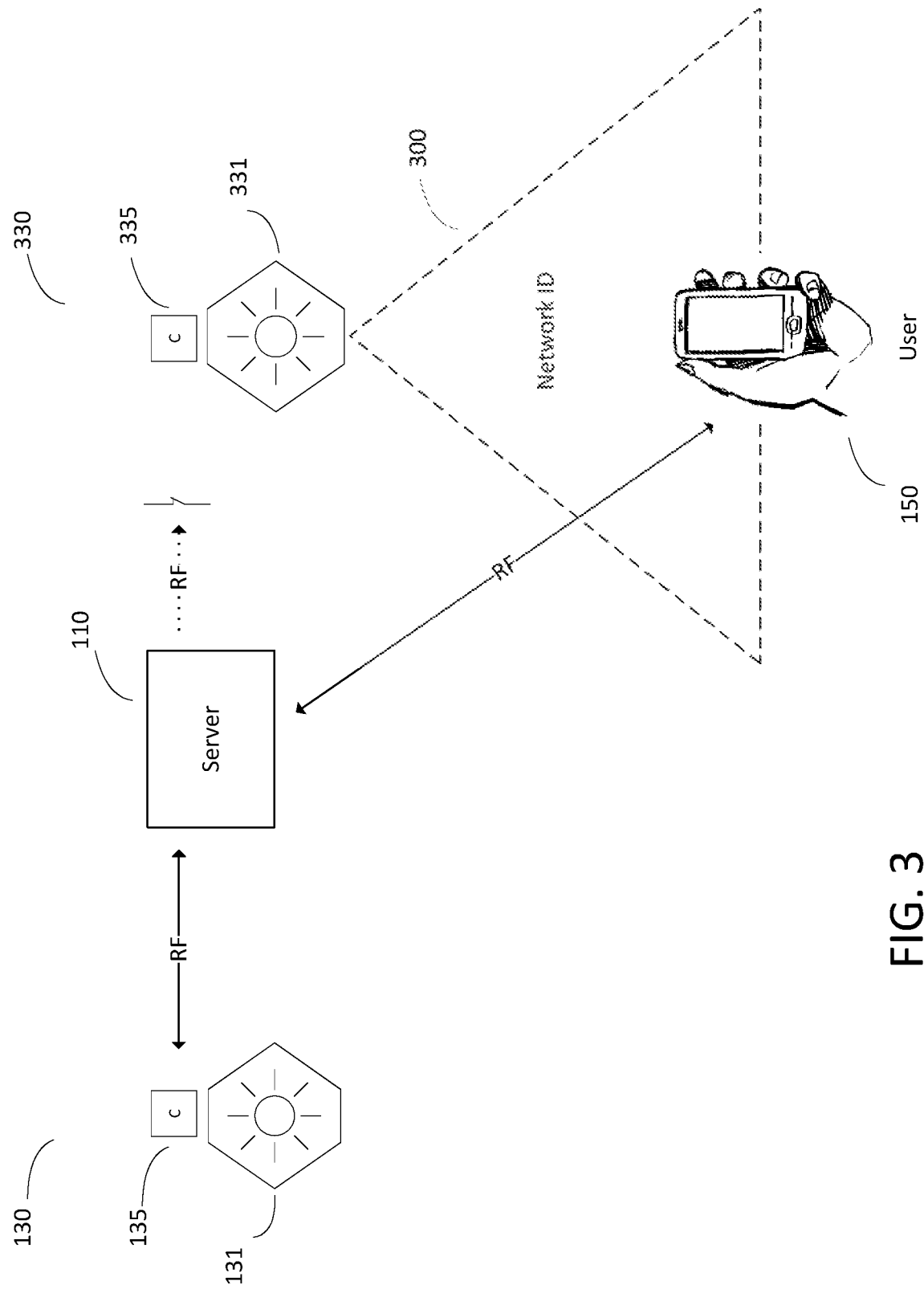
FIG. 3 is a diagram depicting an exemplary system of receiving a visible light signal from an orphaned node, in accordance with an embodiment of the disclosure.

FIG. 3 depicts an example of an installation of certain components of the lighting control system 100. FIG. 3 particularly illustrates portions of two lighting systems 130, labeled as 130 and 330, respectively. The lighting system 130 depicted in FIG. 3 (which includes a light source 131 and its corresponding lighting controller 135) is configured correctly, so as to be able to receive from and transmit to lighting management server 110. Lighting system 330 (which includes a light source 331 and its corresponding lighting controller 335) is isolated from lighting management server 110 and the rest of the devices on the network, i.e., the components of lighting system 330 are orphaned. Attempts by lighting management server 110 to communicate with lighting system 330 via RF transmission will fail, because lighting system 330 is erroneously configured to listen for traffic with a different network identifier, i.e., traffic on a different wireless network.

In another embodiment, lighting system 330 may be listening for traffic with the correct network identifier but over the wrong channel (i.e. wrong frequency), different from the channel lighting management server 110 is transmitting on. Either way, lighting system 330 is isolated from normal communication, which, in the preferred embodiment, is RF communication via wireless network 120.

Lighting management server 110 is unaware of what network identifier the lighting system 330 is actually configured to hear, and therefore cannot send a request to lighting system 330 to send that information to the server 110 or to change its own settings. While it is possible in theory that server 110 could send messages with every possible network identifier until it hits upon the one correct outcome, such a method is impractical.

This may be resolved through the use of a networked device (here, the mobile device 150) that has a means for communication separate from RF communication (or whatever the normal method of communication over the network 120 may be). As illustrated in FIG. 3, a user may carry the mobile device 150 into an environment in which the orphan light source 331 is located.

In one exemplary embodiment, the orphaned lighting system 330 is in a configuration mode, i.e., a mode in which data is conveyed by the emission of light source 331 to aid in network configuration, the configuration mode being separate from the normal operation of the light source 331 (which is generally to illuminate a particular area in the manner set by the lighting management server 110). The lighting system 330 may in one example automatically enter a configuration mode after first being powered up during installation. In another example, a user may convey a request to the orphan lighting system 330 to enter a configuration mode, for example by pressing a button on the light source 331, or by connecting to a component of the lighting system 330 via a wired connection. Alternatively, in another exemplary embodiment, rather than a specific "configuration mode," the lighting system 330 may be configured to continuously (or periodically) operate to perform the function of conveying data by the emission of light source 331, without leaving its normal mode of operation.

It will be understood that the configuration mode is, in a preferred embodiment, applied as a configuration process after installation of the lighting system 330 and before normal operation thereof. However, it may be possible for the lighting system 330 to be configured to operate in a configuration mode even as it performs its normal operation. In another embodiment, lighting system 330 may operate in a configuration mode at a scheduled timeslot, for example, during a system maintenance window and/or on a cyclical basis, e.g., weekly or monthly, as appropriate. In yet another embodiment, the configuration mode may be initiated by the pressing of a physical switch on the light source 331, which the user of the mobile device 150 can engage when near the light source 331.

When the light source 331 is in the configuration mode (or performing the functions thereof), the lighting controller 335 controls the light source 331 to emit a visible light signal 300 that conveys information relevant to the configuration of the lighting system 330. One example of transmission using such visible light communication (VLC) for providing navigation information is described in U.S. Patent Publication No. 2009/0171571 A1 ("Navigation System and Method Using Visible Light Communication").

With reference to FIG. 3, in the preferred embodiment of the present disclosure, lighting controller 335 acts as a signal modulator which controls the light source 331 (e.g., an LED) to transmit visible light signals that use intensity modulation to encode data. In the preferred implementation, lighting controller 335, which is aware of the network identifier with which the components of lighting system 330 are configured to communicate, converts data representing that network identifier into a protocol suitable for transmission by the light source 331. The lighting controller 335 then controls the associated relay (FIG. 1) so as to turn light source 331 repeatedly on and off (i.e., controlled intensity modulation) in a manner that conveys the network identifier data within the area illuminated by the light source 331. This transition between on and off (and vice versa) occurs very quickly, at a rate that is not visible to the human eye of the user. The visible light signal 300 created by that modulation conveys data to a receptive photosensor 154 in the mobile device 150.

It will be noted that the light source 331 may be configured to transmit visible light in only a certain direction and area. In addition, the illumination or brightness of the light will diminish over distance. Further, visible light cannot, for example, travel through walls or doors or travel past a certain distances with a high illumination. A light source may only emit a visible light signal in a fixed area after it is installed within a facility, although such visible light may reflect off of different surfaces (e.g., walls). In view of this, the photosensor 154 will only be able to detect data transmitted by the light source 331 through the visible light signal 300 when the photosensor 154 is within the fixed area illuminated by the light source 331. It will be understood that while the present disclosure refers to the area illuminated by the light source 331 as "fixed," such fixed area may change after installation if the light source 331 is modified or reconfigured in a manner than changes its direction, brightness, output shape, or the like. To the extent that areas illuminated by multiple light sources overlap and the mobile device 150 receives multiple visible light signals while trying to ascertain the visible light signal 300 of the particular light source 331, the mobile device 150 will, in the preferred embodiment, assume that the visible light signal that has the strongest strength or brightness was transmitted by the light source that is physically closest to the mobile device 150.

Figures 4A, 4B:
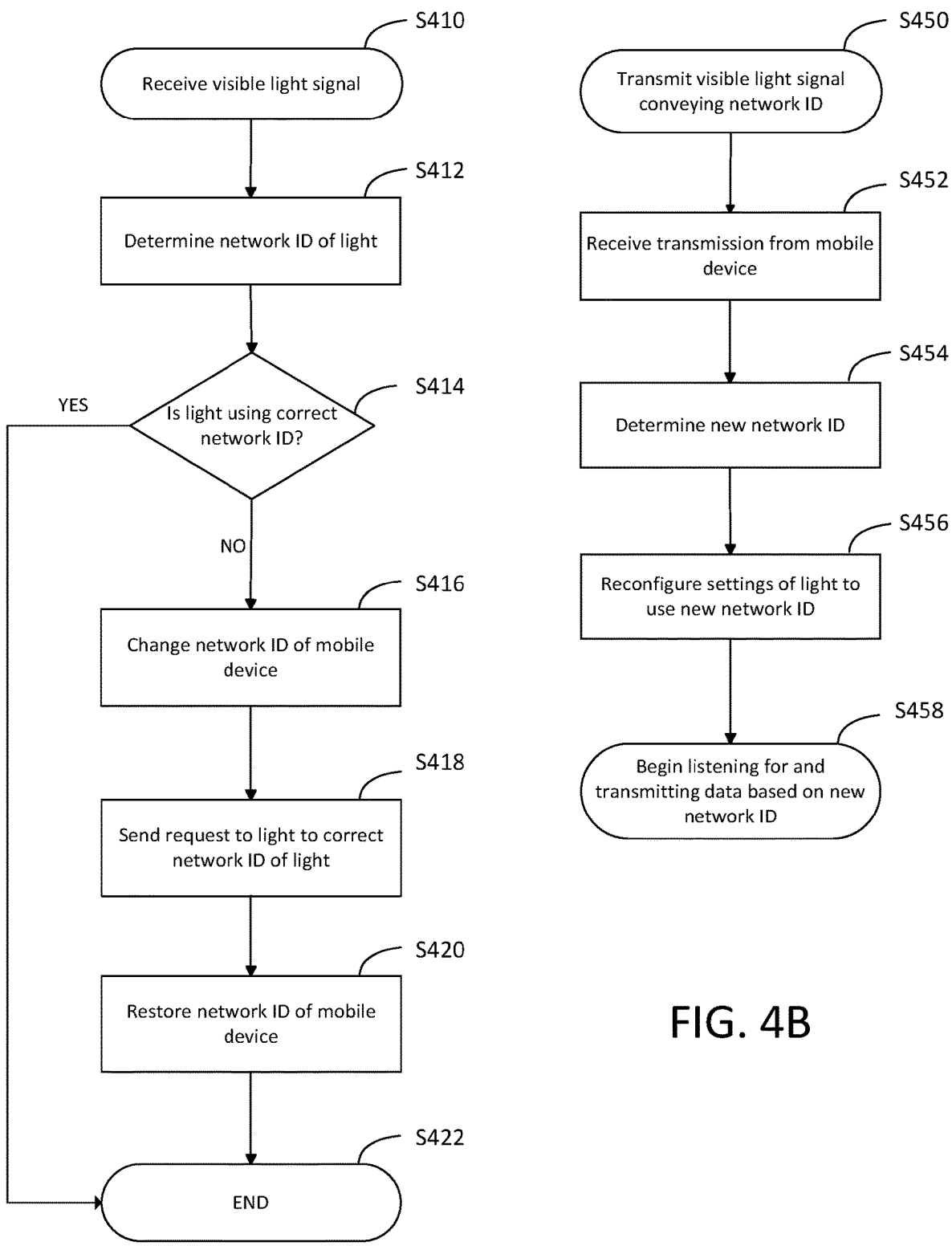
FIG. 4A is a flowchart depicting an exemplary process of recognizing an orphaned node, in accordance with an embodiment of the disclosure.
FIG. 4B is a flowchart depicting an exemplary process of reconfiguration performed by an orphaned node, in accordance with an embodiment of the disclosure.

FIG. 4A depicts an exemplary process of correcting the configuration of the lighting system 330 by the mobile device 150. When the mobile device 150 has entered an area illuminated by the light source 331, such as a room of a building, or, more commonly, an area located immediately beneath the light source 331, the photosensor 154 of the mobile device 150 is able to recognize the visible light signal 300 transmitted by the light source 331. In step S410, the photosensor 154 receives the visible light signal 300. The photosensor 154 then determines, in step S412, from the visible light signal 300, a network identifier of the light source 331, i.e., a value identifying the wireless network on which the light source 331 (and all of lighting system 330) is configured to transmit and receive information.

It will be understood that while the words "network identifier," "network ID," "identifies the network," or "[in] correct network," and the like are used throughout the present disclosure, an embodiment of the invention could use, as an alternative to a network identifier, another value relevant to communication to and from the light source. For example, in a system with a multi-channel architecture, a light source could instead transmit, through VLC, a channel identifier that specifies a particular channel (e.g., a frequency or range/band of frequencies) over which wireless communication to and from a node should be performed.

The control logic 156 of the mobile device 150 determines in step S414 whether the network identifier identifies the network that the lighting system 330 is intended to communicate on, i.e., whether lighting system 330 is using a correct or an incorrect network identifier. In a preferred embodiment, the control logic 156 makes this determination through a comparison of the network identifier received from the visible light signal 300 to the network identifier that the mobile device 150 is currently configured to use, which is the same network identifier used by the lighting management server 110. In another embodiment, the control logic 156 makes the comparison to a correct network identifier stored in a memory or cache (not shown) of mobile device 150. In yet another embodiment, the mobile device 150 transmits the network identifier received from the visible light signal 300 to the lighting management server 110 or another device on the network, and receives in response a determination of whether the light source 331 is configured to be on the correct network. If the light source 331 is determined to use to the correct network identifier, no reconfiguration is necessary, and the process ends at step S422. If the light source 331 is determined to use the wrong network identifier (i.e., the light source 331, and accordingly, the lighting system 330, is orphaned), the process will proceed to step S416.

In step S416, the control logic 156 of the mobile device 150 begins a correction of the configuration of the orphaned light source 331. This will be done by sending a message, via the network interface 158, to the lighting system 330. This message should be sent by the method of communication routinely used for communication through the lighting control system 100, generally, in the preferred embodiment, a multicast message sent via RF transmission. In an alternate embodiment, the mobile device 150 may send a unicast message to the lighting controller 335 in order to ensure, by way of an acknowledgment, receipt of the message.

In an embodiment where the orphaned light source 331 has transmitted its network identifier, because the message to the orphaned lighting system 330 is being sent through RF communication, and because the orphaned lighting system 330 is disconnected from the network 120, the mobile device 150 must first, in step 416, change its settings to enable communication with the same (erroneous) network identifier that is being used by the orphaned lighting system 330. Once it has changed its settings, the mobile device 150, in step S418, sends a message to the orphaned lighting system 330. This message may include, in one embodiment, an instruction or request for the lighting controller 335 to reconfigure the lighting system 330 to use the correct network identifier, i.e., the correct network identifier is specified in the sent message. In one embodiment, the message may simply contain the correct network identifier. The lighting controller 335 may, in response, recognize the transmission of a network identifier as a request that the lighting system 330 should be reconfigured to transmit and receive communications on the basis of that received network identifier. In another embodiment, the message sent by the mobile device 150 may contain instructions to the lighting controller 335 to do such reconfiguration, the instructions taking the form of logic or code, or the like.

In an alternative embodiment with a multi-channel architecture, where the orphaned light source 331 has transmitted a channel identifier, the mobile device 150 must, in step 416, change its set frequency to effect communication on the same erroneous channel (in the same frequency range) being used by the orphaned lighting system 330. As described above, the mobile device 150 may in step S418 send an instruction or request to the lighting controller 335 to transmit on a "correct" channel, for example, by providing the correct channel identifier and/or other relevant information.

Once the mobile device 150 has sent its request for the lighting controller 335, it can restore its own settings to the use the correct network ID or to communicate on the correct channel, in step S420. This restoration will allow the mobile device 150 to communicate with the lighting management server 110 and other networked devices. The process is complete in step S422.

In the preferred embodiment, the mobile device 150 performs steps S410-S420 automatically. However, in an alternative embodiment, the control logic 156 of mobile device 150 may prompt the user of the mobile device to instruct the mobile device 150 to perform any appropriate steps. For example, the user of the mobile device 150 may, through user interface 152, view the network identifier received via the visible light signal 300 emitted by the light source 331, and may in response, through user interface 152, enter an instruction for the mobile device 150 to send a control message to the lighting controller 335 instructing that it change the network identifier (or the channel) for lighting system 330.

FIG. 4B illustrates an exemplary embodiment of the corollary process conducted by the orphaned lighting system 330. In step S450, the light source 331, in a configuration mode, transmits a visible light signal 300 that contains data representative of the network identifier that the light source is configured to use. As described above, this "network identifier" may be a value identifying a particular wireless network, a particular channel of communication, or another indication of the configuration of the light source 331. It will also be understood that while "network identifier" is used, in one embodiment, the information transmitted in the visible light signal 300 by the light source 331 may additionally or alternatively include other data relevant to the functionality of the light source 331.

In step S452, the orphaned lighting system 330 receives a message sent from the mobile device 150. The lighting controller 335, which controls the functionality of the lighting system 330, in step S454, processes instructions in that received message to determine a new, corrected network identifier. It will be understood that the lighting controller 335 is configured to recognize the received message as a request for reconfiguration.

Accordingly, in step S456, the lighting controller 335 switches the settings of the lighting system 330 to enable RF communication with the network identifier used by the other devices on network 120, so as to be able to communicate with the lighting management server 110. In a preferred embodiment, the lighting controller 335 does not perform any processing before switching its settings ("reconfiguration"), in the interest of restoring connectivity to the lighting system 330 as quickly as possible. However, in an alternative embodiment, lighting controller 335 performs a comparison of the network identifier it was first configured to use with the corrected network identifier sent by the mobile device 150 prior to performing any reconfiguration. In another embodiment, the lighting controller 335 compares the corrected network identifier sent by the mobile device 150 to a value stored in a memory (not shown) of the lighting system 330 prior to performing any reconfiguration.

In an alternative embodiment with a multi-channel architecture, where lighting system 330 has been determined to have been communicating on the wrong channel, the lighting controller 335, in step S456, reconfigures its settings to communicate over the correct channel. In such an embodiment, the lighting controller 335 may receive, from the mobile device 150, a channel identifier specifying the "correct" channel for communication. The lighting controller 335 then uses the received channel identifier to determine the range of frequencies corresponding to the specified channel, and changes its settings to transmit and receive data over a frequency within that range.

By step S458, the lighting system 330 should be configured to send and receive data using the correct network identifier and/or over the correct channel. Accordingly, in the preferred embodiment, the lighting system 330 automatically resumes normal operation using the corrected network settings. In an alternative embodiment, the lighting controller 335 may send and/or receive a message to/from the lighting management server 110 or other network device to confirm its reconfiguration.

Through the processes described above and illustrated in FIGS. 4A and 4B, the previously-orphaned lighting system 330 can now communicate on the correct network. Lighting management server 110 can successfully send messages to lighting system 330, without having had to change its own settings or otherwise disrupt communication to other lighting systems 130.

In another alternative embodiment, each lighting system 130 may be designed so as to have a "default" network identifier common to all lighting systems 130, and so as to be capable of transmitting and receiving information using both the default identifier as well as a network identifier that it is separately configured to use (i.e., the network ID designating wireless network 120). In this alternative embodiment, the request for reconfiguration of the lighting system 130 may originate from the lighting management server 110. Specifically, rather than change its own settings to send a message to the lighting controller 335, the mobile device 150 may instead transmit, to the lighting management server 110, a set of information containing the MAC address of the orphaned light source (or other information identifying the light source or lighting system) and the network identifier identifying the network on which the orphaned lighting system is erroneously configured to communicate. As described above, this transmission is done through the network interface 158 of the mobile device. In another embodiment, the lighting management server 110 is already aware that a particular light source 331 is an orphan light source, and queries the mobile device 150 to obtain the network identifier being used by that light source 331. In such a case, the mobile device 150 may transmit to the lighting management server 110 only the network identifier transmitted by the light source 331. Lighting management server 110 receives the information transmitted from the mobile device 150 via network interface 220. The control logic 250 then sends a message to the orphaned light source 331 through use of the default network identifier. As described above, such message may contain instructions for reconfiguring the settings of the light source 331 to use the "correct" network identifier used by the other light sources on network 120.

The systems and methods described above provide a way to configure an orphaned light source even in a lighting system that was not installed in any predefined configuration, and where an installer does not have any knowledge of how to configure a particular light source to participate in the wireless network. Accordingly, the process of installing lights is simplified, and errors that otherwise could arise during configuration are mitigated or prevented.

This disclosure may be provided in other specific forms and embodiments without departing from the essential characteristics as described herein. The embodiments described are to be considered in all aspects as illustrative only and not restrictive in any manner.

Now, therefore, the following is claimed:

1. A system comprising:
a server configured to communicate on a first network identified by a first network identifier;
a lighting system comprising a light source and a lighting controller, wherein the lighting controller is configured to communicate using a second network identifier different from the first network identifier and to modulate the light source so as to cause the light source to transmit a visible light signal that communicates the second network identifier; and
a mobile device comprising a photodetecting sensor, the mobile device being configured to communicate with the server using the first network identifier,
wherein the mobile device is further configured to:
 (a) receive, from the light source, via the photodetecting sensor, the visible light signal transmitted by the light source;
 (b) interpret the visible light signal to determine the second network identifier;
 (c) compare the second network identifier to the first network identifier;
 (d) determine that the second network identifier is different than the first network identifier; and
 (e) take a corrective action in accordance with the determination that the second network identifier is different than the first network identifier, and
wherein, in response to the corrective action, the lighting controller is configured to communicate using the first network identifier.

2. The system of claim 1, wherein the first network identifier identifies a channel on which the server is configured to communicate and the second network identifier identifies a channel on which the lighting controller is configured to communicate.

3. The system of claim 1, wherein the corrective action comprises:
configuring the mobile device to communicate using the second network identifier; and
transmitting, to the lighting controller, based on the second network identifier, an instruction to stop communicating using the second network identifier and to communicate with the server using the first network identifier, wherein the instruction comprises the first network identifier.

4. The system of claim 3, wherein the mobile device transmits the instruction to the lighting controller via a radio frequency communication.

5. The system of claim 1, wherein the corrective action comprises:
transmitting, to the server, information identifying the lighting system.

6. The system of claim 5, wherein the information identifying the lighting system is the MAC address of the light source.

7. The system of claim 5, wherein the server is further configured to:
receive, from the mobile device, the information identifying the lighting system,
transmit, to the lighting controller, an instruction to communicate on the first network, wherein the instruction comprises the first network identifier.

8. The system of claim 1, wherein the light source is an LED, and
wherein the lighting controller modulates the light source by repeatedly switching the LED between an "on" state and an "off" state, so as to modulate the intensity of the light emitted by the LED.

9. A method comprising:
receiving, by a mobile device configured to communicate based on a first network setting, a visible light signal transmitted by a light source, the light source being part of a lighting system comprising the light source and a lighting controller that is configured to control the light source;
obtaining, by the mobile device, from the received visible light signal, a second network setting, wherein the lighting system is configured to communicate based on the second network setting;
comparing, by the mobile device, (a) the second network setting based on which the lighting system is configured to communicate to (b) the first network setting;
taking a corrective action, by the mobile device, in a case that the second network setting is different from the first network setting; and
controlling the lighting system, by the lighting controller, in response to the corrective action by the mobile device, to stop communicating based on the second network setting and to communicate based on the first network setting.

10. The method of claim 9, wherein the second network setting is a network identifier or a channel identifier.

11. The method of claim 9, wherein the corrective action comprises:
reconfiguring the mobile device to communicate based on the second network setting; and
transmitting, by the mobile device, to the lighting controller, based on the second network setting, an instruction to communicate based on the first network setting.

12. The method of claim 9, wherein the corrective action comprises:
- sending, by the mobile device, to a remote device of a network corresponding to the first network setting, a notification that includes information identifying the lighting system, and
- wherein, in response to the corrective action by the mobile device, the remote device transmits, to the lighting controller, based on the second network setting, an instruction to communicate based on the first network setting.

13. The method of claim 9, wherein the mobile device receives the visible light signal only when the mobile device is within a predetermined area relative to the light source.

14. The method of claim 9, further comprising:
- controlling the light source, by the lighting controller, in response to the corrective action by the mobile device, to modulate the light source to transmit a visible light signal that (a) comprises the first network setting and (b) does not comprise the second network setting; and
- receiving, by the mobile device, from a visible light signal transmitted by the light source, the first network setting.

15. A method performed by (a) a light source, (b) a lighting controller configured to control the light source, and (c) a network interface configured to receive and transmit messages via one or more channels of communication, the method comprising:
- transmitting, by the light source, a visible light signal that communicates data, the data comprising a first network setting, wherein the first network setting identifies a first channel of communication via which the network interface is configured to receive messages;
- receiving, by the network interface, a message conveying a second network setting that identifies a second channel of communication that is different than the first channel of communication identified by the first network setting; and
- in response to the message, taking a corrective action, by the lighting controller,
- wherein the corrective action comprises reconfiguring, by the lighting controller, the network interface to receive messages via the second channel of communication identified by the second network setting.

16. The method of claim 15, wherein the corrective action further comprises one or more of:
- (a) listening, by the network interface, for messages that include the second network setting; and
- (b) reconfiguring the light source, by the lighting controller, to transmit a visible light signal communicating data comprising the second network setting.

17. A system for identifying a lighting node orphaned from communication over a network, the system comprising:
- a server configured to communicate on the network using a first network identifier;
- a mobile device comprising a photodetecting sensor, wherein the mobile device is configured to communicate with the server using the first network identifier; and
- a lighting node comprising a light source and a lighting controller, wherein the lighting controller is configured to communicate using a second network identifier different from the first network identifier and is further configured to modulate the light source so as to cause the light source to transmit a visible light signal comprising the second network identifier;
- wherein the mobile device is further configured to:
  - (a) receive, via the photodetecting sensor, the visible light signal transmitted by the light source;
  - (b) identify, from the visible light signal, the second network identifier;
  - (c) determine, based on a determination that the second network identifier is different than the first network identifier, that the lighting node comprising the light source is an orphaned node; and
  - (d) take a corrective action in accordance with the determination that the lighting node comprising the light source is an orphaned node.

18. A method for identifying a lighting node orphaned from communication over a network identified by a first network identifier, wherein nodes of the network use the first network identifier for communication over the network, the method comprising:
- receiving, at a mobile device, a visible light signal from the lighting node, wherein the visible light signal has been modulated by the lighting node with a second network identifier different from the first network identifier, and wherein the second network identifier is used by the lighting node for attempting network communication;
- identifying, at the mobile device, the second network identifier from the visible light signal;
- determining, with at least one processor, that the second network identifier identified from the visible light signal is different than the first network identifier;
- identifying, with the at least one processor, the lighting node as orphaned from communication over the network based on the determining; and
- triggering a corrective action, with the at least one processor, in response to the identifying of the lighting node as orphaned from communication over the network, wherein the corrective action causes the lighting node to begin using the first network identifier for communication over the network.

* * * * *